United States Patent Office 3,521,451
Patented July 21, 1970

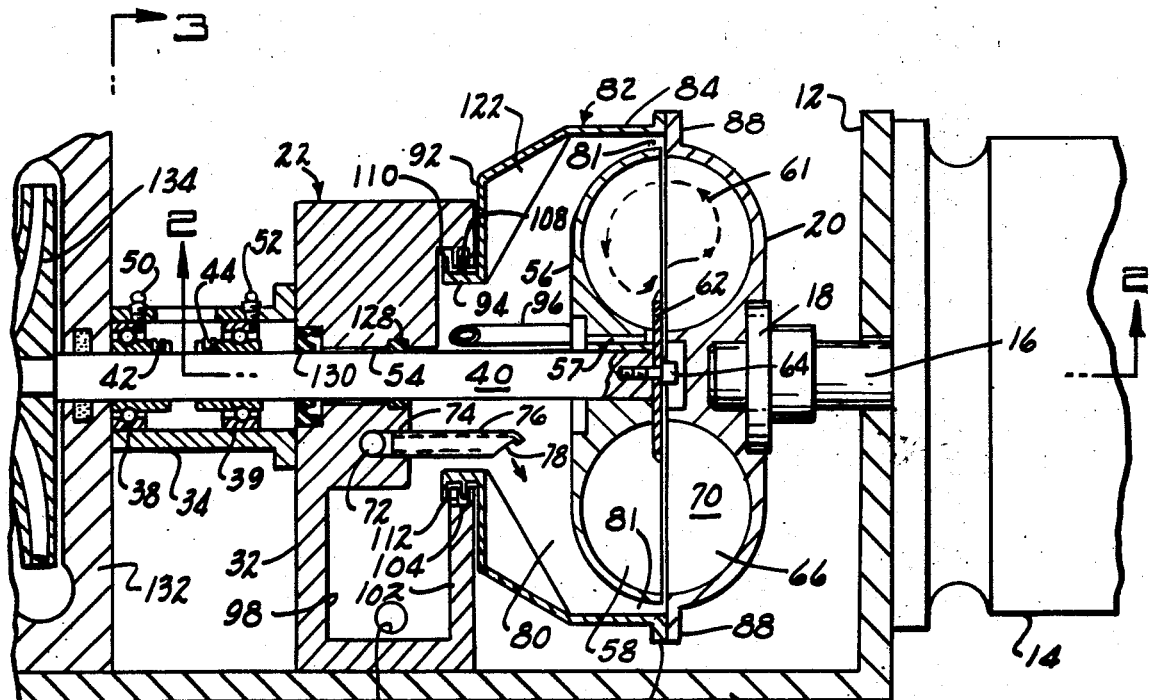
FIG_1
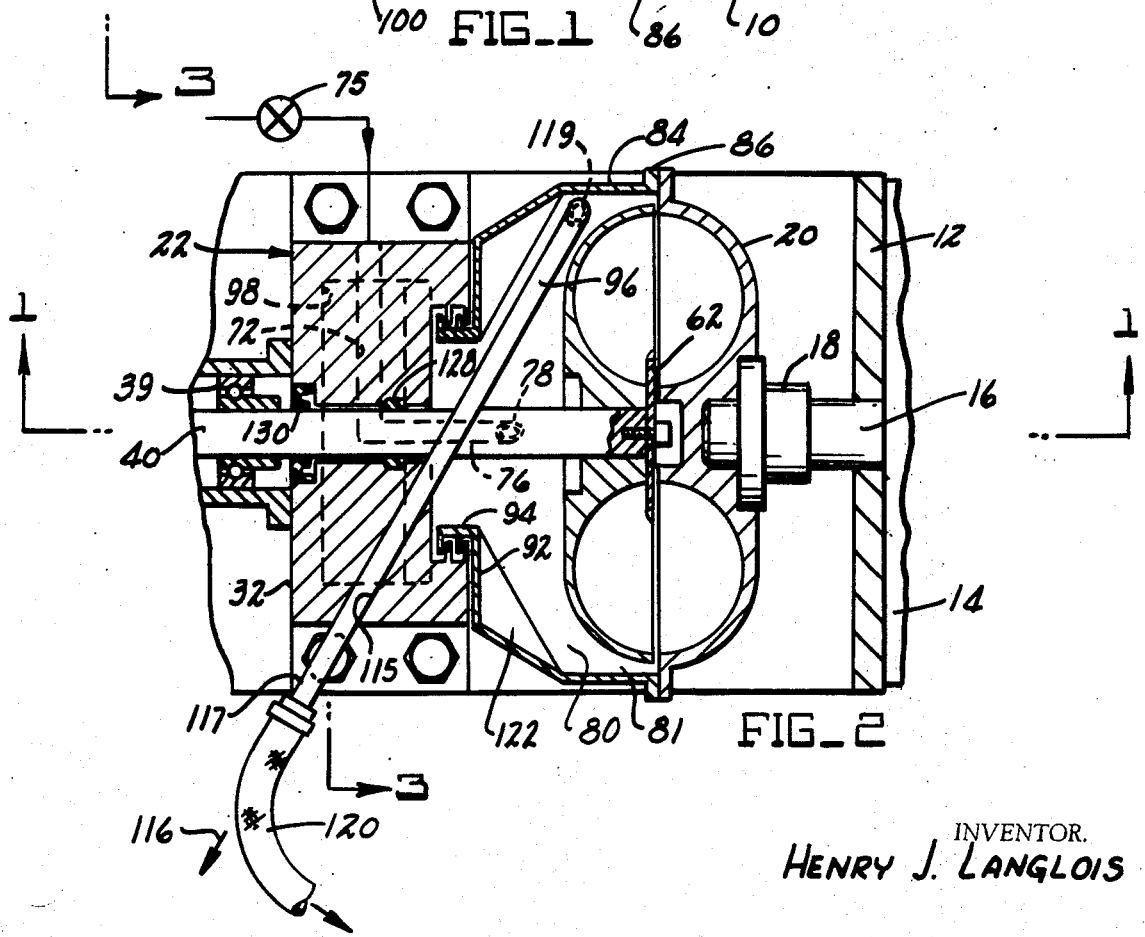
FIG_2
INVENTOR.
HENRY J. LANGLOIS

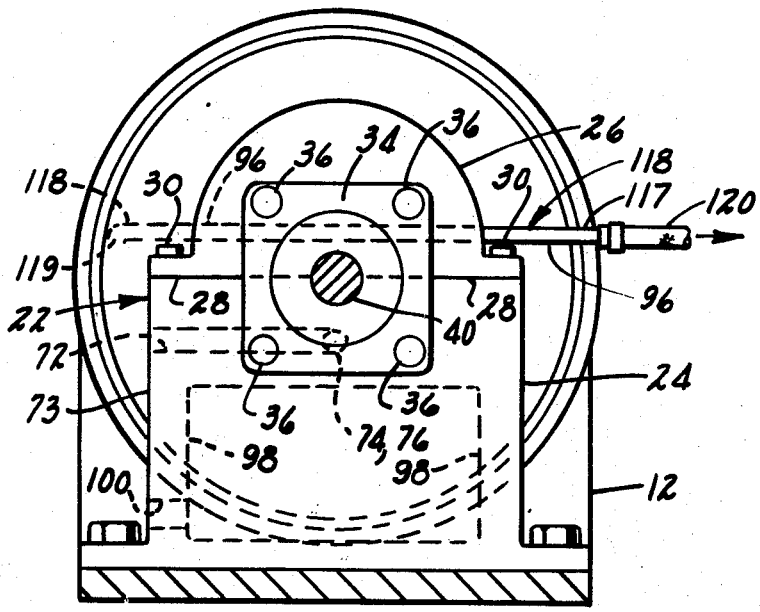
FIG_3

3,521,451
FLUID COUPLING USING WATER
Henry J. Langlois, Detroit, Mich., assignor to American Standard Inc., New York, N.Y., a corporation of Delaware
Filed Aug. 13, 1968, Ser. No. 752,251
Int. Cl. F16d *33/06, 33/14*
U.S. Cl. 60—54                                             10 Claims

ABSTRACT OF THE DISCLOSURE

A fluid coupling using primarily water as the power transmitting fluid but adaptable for use with other fluids. A movable scoop tube controls the power transmitting fluid level, but the usual stationary housing around the rotating elements has been omitted as an economy feature of the design; the scoop tube discharges to the building drain instead of to a sump in the stationary housing. Seals are provided on the runner shaft to prevent water leakage out of the rotating elements and into the shaft bearings. Since water flowing out of the coupling is directed to the building drain without being re-used there is no necessity for an auxiliary recirculation pump or fluid cooler.

THE DRAWINGS

FIG. 1 is a vertical sectional view taken through a fluid coupling embodying the invention.
FIG. 2 is a horizontal sectional view substantially on line 2—2 in FIG. 1.
FIG. 3 is a transverse vertical sectional view taken on line 3—3 in FIG. 1.

THE DRAWINGS IN GREATER DETAIL

This invention is directed especially to reducing the cost of couplings, especially low horsepower couplings in the 5 horsepower through 300 horsepower range. Toward that end the coupling is designed without the usual stationary casing which contains the rotating components, the usual liquid supply pump or the usual heat exchanger. Further the coupling is built with only one set of bearings; this allows the coupling to be direct-connected to an electric drive motor, and to utilize the motor bearings for supporting the impeller portion of the coupling. In one application the runner portion of the coupling is direct-connected to a centrifugal water pump in a manner whereby the pump impeller relies on the coupling runner shaft bearings for its support. The general aim is cost reduction in the coupling construction and in the motor-coupling-pump assembly.

The coupling shown in FIG. 1 comprises a flat base plate 10 having an upstanding flange or wall 12 for mounting an electric motor 14, said motor having a drive shaft 16 freely projecting through wall 12 to a fixed connection 18 with a vaned impeller shell 20. If the coupling is to be used with a free-standing motor the flange 12 is omitted and the motor is positioned on a planar extension of plate 10. Impeller shell 20 cooperates with a vaned runner shell 56 carried by runner shaft 40 to form the power-transmitting portion of the coupling.

MANIFOLD CONSTRUCTION

Located on the left end portion of base 10 is an upstanding manifold 22. As shown in FIG. 3, the manifold comprises a lower block-like section 24 and an upper cover-like section 26, said sections having an interface 28 and being bolted together as at 30. Interface 28 is on the horizontal center line of the couling so that separation of the two manifold sections permits ready assembly and disassembly of the coupling components. By suitable redesign of certain components the manifold could be formed as a one piece casting instead of the two pieces shown.

As seen in FIG. 1, left face 32 of the manifold is flat for accommodating a conventional flanged bearing housing 34, said housing being held on the manifold by bolts 36 (FIG. 3). Antifriction bearing assemblies 38 and 39 are secured to a runner shaft 40 by set screws 42 and 44, and to the flanged housing 34 by press fit operations. Suitable grease fittings 50 and 52 provide for lubrication of the bearings.

IMPELLER-RUNNER CONSTRUCTION

Shaft 40 extends through an oversize bore 54 in manifold 22 to a fixed press-fit connection with a runner shell 56 having radial vanes 58. In the illustrated construction a circular plate 62 is clamped on shaft 40 by a screw 64. The primary purpose of plate 62 is to deflect the working fluid during high slip periods, to cause the fluid to take the path denoted by arrows 61 in FIG. 1, and thus prevent such collapse in the fluid torus as would result in unstable runner speeds. During low slip periods the toroidal flow is largely confined to the space beyond the outer edge of plate 62 so that the plate does not serve any purpose during such periods. Impeller shell 20 is provided with radial vanes 66 which cooperate with runner vanes 58 to form the work chamber designated generally by numeral 70.

Liquid is supplied to the work chamber through a transverse passage 72 drilled or otherwise formed in manifold section 24. As shown in FIG. 3, passage 72 extends from the left face 73 of the manifold to the vertical center line of the coupling. A short passage 74 is drilled or otherwise formed on the vertical center line to connect with passage 72, as shown best in FIG. 1. Into passage 74 is fitted a tube 76 having an open discharge end 78 located within a chamber 80 defined by a casing 82.

Casing 82 comprises a peripheral side wall 84 having a radial flange 86 which mates with a flange 88 on the impeller shell 20, suitable bolts (not shown) going through the tube flanges at points around the casing periphery to secure the casing to the impeller shell. Other joining means, such as a continuous weld joint, could be employed in lieu of bolts. The casing extends beyond runner shell 56 and then turns inwardly to define a casing end wall 92. Inner edge 94 of this casing end wall defines a circular opening or eye around the runner shaft 40 for accommodating tube 76 as well as the scope tube 96 (to be described later).

CONTAINMENT OF FLUID WITHIN THE COUPLING

During operation of the coupling chamber 80 is wholly or partially filled with a rotating ring of liquid; centrifugal force prevents the liquid ring from collapsing so as to escape through eye 94. However, during periods of runner deceleration the rotating ring of liquid in chamber 80 tends to collapse inwardly due to the decrease in centrifugal force; some of the liquid is thus apt to escape through casing eye 94. This fluid can collect in a hollow cavity 98 formed in the lower portion of manifold 22; drain opening 100 (FIG. 3) may have a pipe or hose connected with it to direct the collected liquid (water) to the building drain.

Preferably any liquid (water) splashing out of scoop chamber 80 through eye 94 is confined to cavity 98 and is not allowed to escape past the seal at the casing 82-manifold 22 joint. To provide a suitable seal the right wall 102 of the manifold is formed with a continuous radial groove 104, and casing wall 92 is provided with two outwardly radiating flanges 108 and 110. The groove 104 thus cooperates with flanges 108 and 110 to define a labyrinth seal which breaks the natural water splash path across the casing-manifold joint. Any water collecting in groove 104 drains into cavity 108 through a drain hole 112 formed in a lower portion of the groove side wall.

FLUID LEVEL CONTROL

The liquid level in work chamber 70 is controlled by a scoop tube 96 which extends into the scoop chamber 80. Tube 96 is shown as an elongated straight cylindrical tube mounted in a guide bore 115 in the upper section 26 of the manifold, said guide bore occupying a horizontal plane as shown in FIG. 3, but being at an oblique angle to the radial plane of the coupling as shown in FIG. 2. Tube 96 is thus able to extend through eye 94 of casing 82 and into the scoop chamber 80. The scoop tube can project substantially completely into chamber 80 so that its entrance opening 119 is near the outer periphery of the scoop chamber as shown in FIG. 2, in which case the scoop tube is effective to remove all of the working liquid in the scoop chamber and connected work chamber, thus causing the coupling to be completely declutched and bringing the runner shaft to a complete stop. Alternately the scoop tube can be drawn in the arrow 116 direction (FIG. 2) to a position in which its water entrance opening 119 is near the coupling axis, in which case the coupling is in a substantially fully clutched position. Intermediate positions of the scoop tube provide various different slippages and runner shaft speeds.

As shown in FIGS. 2 and 3, the discharge end 117 of the scoop tube can have a flexible hose 120 clamped or otherwise secured thereto for directing the water to a building drain (not shown). The flexibility of hose 120 permits tube 96 to be readily moved back and forth without interrupting the connection to the drain. Manual or condition-responsive power mechanism (not shown) may be connected to tube 118 for moving same to different selected positions.

WATER AS WORKING FLUID

This coupling can be operated with oil as the working fluid. However it has been especially designed to be operated with water as the power transmitting fluid instead of with oil as is usually the case. In using the coupling the water supply passage 72 will be connected to a source of city water pressure which may be regulated by pressure regulator means (not shown) to provide a steady uniform flow of water to the coupling, for example three gallons per minute in a typical example. The water flow can vary, as long as there is sufficient flow to prevent the water from overheating during its passage through the coupling; overheating can turn the water into steam, thus interrupting the power transmission.

The water admitted to passage 72 is discharged through tube 76, into chamber 80, and through peripheral space 81 into the work chamber 70. In the illustrated coupling the corners between casing end wall 92 and casing side wall 84 are provided with pump vanes 122 which act to keep the chamber 80 liquid in the outer portion of the chamber. The water thus takes the form of a liquid ring filling the outer portion of the scoop chamber, thereby effecting a predetermined fill of the work chamber 70. The radial thickness of the scoop chamber liquid ring is determined by the position of scoop tube 96, said scoop tube having its water entrance opening 119 arranged to skim off the water on the inner surface of the ring to thereby maintain the ring thickness. Movement of tube 96 in the arrow 116 direction increases the ring thickness and the quantity of liquid in chamber 70. Movement of tube 96 in the opposite direction decreases the ring thickness and the quantity of liquid in chamber 70. Shaft 40 speed is proportionate to the quantity of liquid in chamber 70.

Runner shell 56 is provided with one or more vent holes 57 leading from the shell vane space to chamber 80. Under high runner speed conditions these holes 57 act as vents for the vane spaces, thus preventing the work chamber from becoming air bound. On conditions of momentary overload applied to shaft 40 holes 57 can act as water exhaust passages to remove liquid from the work chamber; the holes thus aid in declutching the coupling. On normal run conditions liquid is supplied to work chamber 70, and removed therefrom, through the peripheral space 81; holes 57 do not act as supply passages.

Conventional couplings of the variable speed type use oil as the power-transmitting fluid. The oil is removed from the coupling through a scoop tube and is then discharged into a sump located below the rotating portions of the coupling. An auxiliary pump moves the oil out of the sump through an external cooler (usually of the tube-shell type) and thence returns the oil back into the coupling. The requirement for a cooler imposes a cost consideration which the present invention eliminates, since the present coupling uses city water directly without any cooler. The invention does not use abnormal quantities of water compared to conventional arrangements, since in the conventional arrangements the tube-shell cooler requires a flow of city water through the shell side of the cooler to cool the oil.

Use of water as the power-transmitting liquid has some additional advantage over oil because water has a higher density and lower viscosity, and therefore produces a more effective torroidal flow per given fill condition. The power transmitted is a function of the kinetic energy developed by the torroidal flow. Kinetic energy varies directly as the mass of fluid multiplied by its velocity squared. When water is used instead of oil the mass is increased approximately 15%, and the velocity is increased a proportionate amount due to a lesser viscosity.

Water turns to steam when overheated, but this may actually be an advantage in producing declutching condition upon shaft 40 overload. Thus, by equipping the water supply line with a normally open shut-off valve 75, controlled by a shaft 40 speed-responsive sensor (not shown), it is possible to quickly reduce the quantity of water in chamber 70 in response to shaft 40 speed decrease; the reduced quantity of water is substantially reduced to steam by the internal heat, the steam in turn being unable to transmit the power, thereby declutching the coupling.

Preferably the water flowing through the coupling should avoid coming into contact with the bearings for shaft 40, since the water could corrode the bearings unless special bearing materials were employed. In the illustrated coupling the bearings 38 and 40 are located remote from the water circuit. Further, I preferably provide a water seal in the form of a plastic bushing 128, formed for example from polytetrafluoroethylene.

MANUFACTURING OPERATIONS

Bushing 128 acts not only as a seal but also as an aligning means for shaft 40 and runner shell 56 during assembly operations. The assembly sequence can be varied but illustratively the first operation can be assembly of bearing housing 34 and bushing 128 onto shaft 40. Casing 82 can then be loosely positioned around shaft 40, and the defined assembly then lowered into the semi-circular cavity in the upper face of manifold section 24, after which cover section 26 can be assembled thereon.

A support jig or fixture (not shown) is preferably provided for casing 82 to center said casing on the shaft 40 axis and preclude any binding of flange 108 in groove 104. The centered casing allows runner shell 56 to be assembled onto shaft 40 and have the necessary clearance relative to casing side wall 84. Final assembly is accomplished by mounting motor 14 on base plate 12, assembling impeller shell 20 onto the motor shaft, and connecting shell 20 to casing 82.

The thus-formed assembly may in some instances not have its components in perfect alignment with one another for free running movements of the two shafts. To assure alignment of parts, either or both of motor 14 and bearing housing 34 may be provided with oversize mounting holes. For example, the bearing flange holes which receive bolts 36 may be somewhat oversize compared to the holes in manifold 22 to permit radial adjustment of the bearing assembly; similarly the mounting holes for motor 14 may be somewhat oversize in relation to the holes in plate portion 12. Some interim adjustments of the bearing 34 may have to be performed before final connection of casing 82 with shell 20. During such adjustment operations bushing 128 can act as a support or fulcrum for locating shaft 40 while permitting desired shaft adjustment to relieve any binding tendencies in the shaft bearings, the flange 108, groove 104 joint, or the casing 82, shell 56 joint. As previously noted, casing 82 may be temporarily located in a support fixture during assembly operations; with the casing thus supported it is possible to substantially center the runner shell 56 within casing 82 by suitable radial adjustment of bearing housing 34.

As previously noted the bearings 38 and 40 are provided with grease fittings 50 and 52. These bearings are preferably self-sealed, but in event of any grease leakage a further seal can be provided by a rubber sealing ring 130 which fits within a counter bore in face 32 of the manifold. Seal 130 also prevents any water which might work past seal 128 from getting over to bearing 39.

COUPLING DIAMETER

Centrifugal forces imposed on the rotating elements of fluid couplings increase as the coupling diameter increases; thus large coupling diameters require thicker walls, such walls in turn further increasing the mass loadings. Generally therefore it is desirable to keep the coupling diameter as small as possible. In the present design this is accomplished by forming the coupling so that the liquid is admitted to the work chamber through an annular passage 81 at the outer periphery of the work chamber. Passage 81 is relatively narrow in the radial dimension and serves both as a supply passage for the work chamber and as an exhaust passage from the work chamber. The impeller and runner vanes are located fairly close to the coupling axis because the shaft area does not have to be enlarged to accommodate liquid supply passages. This is in contrast to some coupling arrangements in which the fluid is admitted to the work chamber through passages adjacent the inner areas of the vanes; in such arrangements the space required for the supply passages causes the vanes to be located further away from the coupling axis, thus undesirably increasing the coupling diameter.

BEARING ARRANGEMENT

It will be noted that the illustrated coupling includes an impeller shell 20 which is directly connected to the motor shaft. Thus, the impeller assembly uses the motor bearings for its location, i.e. there is no special bearing devoted solely to the impeller assembly. Also, the illustrated arrangement does without any pilot bearing between the impeller and runner assemblies. Experience indicates that in many cases such an intervening pilot bearing is unnecessary and undesirable. Thus, some radial misalignment of the impeller and runner shells can be tolerated without perceptable performance deficiencies. For example, impeller shell 20 can have its axis displaced a slight distance in any radial direction, and vanes 66 and 58 will still act on the fluid to effectively transmit power. Any radial displacement will reduce the size of passage 81 at one point and increase its size at another point; such radial displacement will also produce some radial displacement of flanges 108 and 110. However the structures are so dimensioned and designed as to accommodate such displacements without serious malfunction. In this connection it is preferred to use the illustrated "rigid" labyrinth seal flanges 108 and 110 in preference to fabric or plastic seals, since such seals cannot accommodate substantial radial displacements without experiencing wear or interference. This is particularly true in large diameter couplings where the effect of eccentricity would be magnified.

The illustrated coupling has its runner shaft 40 extending into a water pump housing 132 to a fixed connection with a vaned water pump impeller 134. Bearing assembly 34 is located approximately midway between the ends of shaft 40 and is the sole support for the shaft and the two vaned fluid members 56 and 134 carried thereon; this arrangement minimizes the number of bearings without producing any serious unsupported shaft overhang.

It is believed that the coupling may have some applications other than direct-connected motor-pump installations. For example, the runner shaft can be fitted with a sheave outboard from bearings 34 for belt-driven installations. Some limitations on horsepower are of course inherent in the design, especially in regard to bearing arrangement. Probably the illustrated bearing arrangement is not suited for large horsepower couplings.

I claim:

1. A fluid coupling comprising a stationary manifold; a runner shaft extending through said manifold; runner shaft bearing means carried by the manifold; a vaned impeller shell spaced from said manifold, said impeller shell having means thereon for direct attachment to a drive motor shaft; a vaned runner shell carried by the runner shaft in confronting relation to the impeller shell to cooperate therewith in defining a work chamber; an annular casing carried by the impeller shell in surounding relation to the runner shell, said casing comprising a peripheral side wall extending beyond the runner shell and an inturned end wall located near the manifold, the casing space between the runner shell and casing end wall constituting a scoop chamber; the periphery of the runner shell being spaced radially inwardly from the casing side wall to afford fluid communication between the work chamber and scoop chamber; said casing end wall defining an eye surrounding the runner shaft; means sealing the joint between the casing end wall and manifold, thereby preventing escape of fluid from the scoop chamber-manifold assembly; means for admitting fluid to the coupling comprising a fluid passage formed in the manifold, and a connecting fluid duct communicating said passage with the scoop chamber; means for withdrawing fluid from the coupling comprising a movable scoop tube extending through the manifold, said scoop tube having a fluid entrance opening disposed within the scoop chamber and a fluid discharge opening disposed outside the manifold; said scoop tube being movable so that its entrance opening can occupy positions within the scoop chamber located different distances from the coupling axis, whereby the scoop tube directly controls the fluid level within the scoop chamber and indirectly controls the fluid level within the work chamber; and sealing means preventing fluid from reaching the runner shaft bearings.

2. The coupling of claim 1 wherein the runner shell and impeller shell are entirely free from one another without intervening pilot bearing, whereby runner-impeller alignment is achieved by adjustment of the runner shaft bearing-drive motor relationship.

3. The coupling of claim 1 wherein the sealing means for the casing-manifold joint comprises a radial groove in the manifold and a radial flange projecting from the casing into said groove; said manifold having a fluid collection cavity therein communicating with said groove via a drain port in the groove side wall.

4. The coupling of claim 1 and further comprising pump vanes carried by the casing in the corner areas between the peripheral side wall and end wall; said pump vanes extending radially outwardly at least as far as the impeller-runner vanes, whereby said pump vanes are able to maintain a solid ring of fluid in the outer area of the scoop chamber for accurately controlling the work chamber fluid level.

5. The coupling of claim 1 wherein the scoop tube comprises a straight elongated tube slidable in the direction of its length; the combination further including a flexible drainage hose connected to the fluid discharge end of the scoop tube whereby the scoop tube can be moved without interrupting the drainage connection.

6. The coupling of claim 1 wherein the manifold is split along the shaft centerline to define a lower manifold section and an upper manifold section; said fluid admitting means being disposed in the lower manifold section, and said fluid withdrawing means being disposed in the upper manifold section.

7. The coupling of claim 1 wherein the manifold is provided with an oversize through bore accommodating the runner shaft; said bearing means comprising a flanged bearing assembly bolted to an exposed face of the manifold.

8. The coupling of claim 7 wherein the flanged bearing assembly includes means for its radial adjustment relative to the manifold through bore.

9. The coupling of claim 1 and further comprising a pump impeller carried by the runner shaft on the end thereof opposite the runner; the aforementioned bearing means being located intermediate the ends of the shaft and serving as the sole support for the shaft, runner and pump impeller.

10. The coupling of claim 1 wherein the power-transmitting fluid is water, the combination further comprising a water supply line connected to the aforementioned passage in the manifold, and a normally open shut-off valve in said water supply line-passage system, whereby closure of said valve is effective to permit the coupling to internally heat the water in the work chamber for turning same to steam, thus declutching the coupling.

References Cited

UNITED STATES PATENTS

| | | | |
|---|---|---|---|
| 1,199,360 | 9/1916 | Fottinger | 60—54 |
| 3,156,095 | 11/1964 | Tauson | 60—54 |
| 3,190,076 | 6/1965 | Meyer et al. | 60—54 |
| 3,260,052 | 7/1966 | Stabler | 60—54 |

EDGAR W. GEOGHEGAN, Primary Examiner